United States Patent
Kuwajima et al.

(10) Patent No.: US 6,852,404 B2
(45) Date of Patent: Feb. 8, 2005

(54) MAGNETIC RECORDING MEDIUM

(75) Inventors: Takayoshi Kuwajima, Tokyo (JP); Osamu Inoue, Tokyo (JP); Akimasa Kaizu, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/397,519

(22) Filed: Mar. 27, 2003

(65) Prior Publication Data

US 2004/0110033 A1 Jun. 10, 2004

(30) Foreign Application Priority Data

Mar. 29, 2002 (JP) ........................................ 2002-098031

(51) Int. Cl.$^7$ ............................................... G11B 5/706
(52) U.S. Cl. ........................ 428/323; 428/328; 428/336; 428/694 BA
(58) Field of Search ............................... 428/323, 328, 428/336, 694 BA

(56) References Cited

FOREIGN PATENT DOCUMENTS

| JP | 9-91697 | 4/1997 |
| JP | 10-320759 | * 12/1998 |
| JP | 11-251122 | 9/1999 |
| JP | 2001-81506 | 3/2001 |

\* cited by examiner

*Primary Examiner*—Stevan A. Resan
(74) *Attorney, Agent, or Firm*—Oblon, Spivak, McClelland, Maier & Neustadt, P.C.

(57) ABSTRACT

The average major-axis length (L) of a ferromagnetic alloy powder primarily contained together with a binder in a magnetic layer provided on at least one surface of a non-magnetic support is less than 0.10 μm, and the ferromagnetic alloy powder contains Co at a content of 15 to 28 at % relative to Fe, and furthermore, contains Y at a content of 22 μmol/m2 or more with respect to a specific surface area (Sc) calculated from the above-mentioned average major-axis length (L) and the crystallite diameter (d). A coating-type high-recording-density magnetic recording medium has excellent surface properties, an excellent electromagnetic transducing characteristic especially in short wavelength regions and high reliability.

20 Claims, No Drawings

MAGNETIC RECORDING MEDIUM

BACKGROUND OF THE INVENTION

1. Field of the Invention

The present invention relates to a magnetic recording medium. Specifically, the present invention relates to a coating-type high-recording-density magnetic recording medium having excellent surface properties and exhibiting excellent performances in a total recording, playback system used in short wavelength regions, and in particular, having an electromagnetic transducing characteristic satisfactorily adaptable to a high-recording-density medium system using an MR head and the like, as well as excellent reliability.

2. Description of the Related Art

In recent years, recording densities of magnetic recording media have been increased, and therefore, further improvements of the electromagnetic transducing characteristic, e.g. reduction in wavelength (for example, a shortest recording wavelength specified in DDS-4, which is one standard on data tapes, is in the order of 0.3 $\mu$m), shift toward a digital recording system and shift toward a system equipped with an MR head for playback (the shortest recording wavelength is 0.25 $\mu$m or less), are required with respect to magnetic recording media. In order to satisfy these requirements, reduction in the magnetic layer thickness is under consideration with respect to the coating-type magnetic recording media.

By reason of the above-mentioned requirements, regarding magnetic recording media including a magnetic layer which contains a ferromagnetic alloy powder (hereafter may be referred to simply as "a magnetic powder" or "a powder") and a binder and which has a reduced layer thickness, so-called multilayer structures provided with a non-magnetic layer between a non-magnetic support and a magnetic layer are often adopted as one means of avoiding problems, such as reduction in an output, noises and head touches during recording and playback, resulting from a surface condition on the non-magnetic support up to this time. In this manner, the electromagnetic characteristic of the magnetic layer having a reduced layer thickness have been also improved. However, even the magnetic recording medium having the multilayer structure has been insufficient to achieve a surface recording density of 0.5 Gbit/inch$^2$ or more, in particular 1 Gbit/inch$^2$ or more.

In order to increase the ratio of a carrier output to a noise output (C/N or S/N) on a unit volume (unit area) basis for increasing a density, reduction in noises, especially noises due to particles, is required, and therefore, reduction in the size of a magnetic powder is attempted. Wh n the size of the magnetic powder is reduced, the number of the particles on a unit volume basis is increased, and the particulate noises can be reduced. Theory holds that the above-mentioned effect can be achieved because when the number of the particles increases by a factor of n, the carrier output increases by a factor of n, and the noise output increases by a factor of the square root of n. Therefore, theoretically, the carrier output/noise output ratio increases by a factor of the square root of n. However, uniform dispersion became difficult as the magnetic powder became small, and when a conventional magnetic powder was used, it was difficult to achieve the above-mentioned theoretical effect through reduction in the size of the magnetic powder.

On the other hand, Japanese Unexamined Patent Application Publication No. 9-91697 discloses that a ferromagnetic alloy powder having an average major-axis length of 0.08 $\mu$m or less is used, an ultrasonic treatment is applied to a magnetic paint, and thereby dispersibility is increased, the surface properties and magnetic characteristics of the magnetic layer, in particular the squareness ratio (residual magnetic flux density/saturation magnetic flux density) and the degree of orientation in a plane, are improved, and a magnetic recording medium exhibiting a high electromagnetic transducing charact ristic is produced. Japanese Unexamined Patent Application Publication No. 11-251122 and Japanese Unexamined Patent Application Publication No. 2001-81506 disclose ferromagnetic metal powders produced by gas reduction of a powder composed of needle particles (average major-axis length: 0.01 to 0.40 $\mu$m), in which iron oxyhydroxide or iron oxide is allowed to contain Co, Al and Y under a predetermined condition, as ferromagnetic metal powders used for coating-type magnetic recording media suitable for high-recording-density recording.

The above-mentioned Japanese Unexamined Patent Application Publication No. 9-91697 discloses a medium having a squareness ratio of 0.88 or more in the plane of a magnetic layer and the degree of orientation of 3.0 or more with respect to a ferromagnetic alloy powder having an average major-axis length of 0.10 $\mu$m or more in an embodiment thereof. However, regarding the ferromagnetic alloy powder having an average major-axis length of less than 0.10 $\mu$m, an upper limit of the squareness ratio was 0.88 in the plane of the magnetic layer, and the upper limit of the degree of orientation was 2.8 from the result of calculation based on the data. That is, the use of the ferromagnetic alloy powder having an average major-axis length of less than 0.10 $\mu$m was insufficient to achieve further improvement in the electromagnetic transducing characteristic. Regarding both magnetic tapes described in the above-mentioned Japanese Unexamined Patent Application Publication No. 11-251122 and Japanese Unexamined Patent Application Publication No. 2001-81506, target thicknesses of the magnetic layers were 3 $\mu$m in the embodiments, and these thicknesses and the ferromagnetic metal powders applied to these thicknesses were insufficient to achieve further improvement in the electromagnetic transducing characteristics as well.

SUMMARY OF THE INVENTION

Accordingly, it is an object of the present invention to overcome the above-mentioned problems and to provide a coating-type high-recording-density magnetic recording medium having excellent surface properties, an excellent electromagnetic transducing characteristic especially in short wavelength regions and high reliability.

The inventors of the present invention performed earnest research to overcome the above-mentioned problems, and found out that the above-mentioned objects was able to achieve by the configuration described below, so that the present invention was completed.

In a magnetic recording medium of the present invention, the average major-axis length (L) of a ferromagnetic alloy powder primarily contained together with a binder in a magnetic layer provided on at least one surface of a non-magn tic support is less than 0.10 $\mu$m, and the ferromagnetic alloy powder contains Co at a content of 15 to 28 at % relative to Fe, and furthermore, contains Y (yttrium) at a content of 22 $\mu$mol/m$^2$ or more with respect to a specific surface area (Sc) calculated from the above-mentioned average major-axis length (L) and the crystallite diameter (d).

Preferably, the above-mentioned ferromagnetic alloy powder contains Al at a content within the range of 27 to 45 $\mu$mol/m$^2$ with respect to the above-mentioned specific surface area (Sc).

In a magnetic recording medium of the present invention, the average major-axis length (L) of a ferromagnetic alloy powder primarily contained together with a binder in a magnetic layer provided on at least one surface of a non-magnetic support is less than 0.10 μm, and the ferromagnetic alloy powder contains Co at a content of 15 to 28 at % relative to Fe, and furthermore, contains Y at a content of 20 mol/m² or more with respect to a BET specific surface area (Sbet) of the ferromagnetic alloy powder.

In this case, preferably, the above-mentioned ferromagnetic alloy powder contains Al at a content within the range of 22 to 38 μmol/m² with respect to a BET specific surface area (Sbet) of the above-mentioned ferromagnetic alloy powder.

In the magnetic recording medium of the present invention, preferably, the average thickness of the above-mentioned magnetic layer is 0.03 to 0.30 μm, and a non-magnetic layer is provided between the above-mentioned non-magnetic support and the above-mentioned magnetic layer.

The magnetic recording medium of the present invention is a coating-type high-recording-density magnetic recording medium which performs recording and playback in short wavelength regions and which has a surface recording density of 0.5 Gbit/inch² or more, wherein the ferromagnetic alloy powder having a small average major-axis length of less than 0.10 μm is used while the sorts of element contained in the ferromagnetic alloy powder and the amount thereof are optimized, and thereby, magnetic characteristics of the powder are improved, and in addition, dispersibility and orientation property are improved. In this manner, spacing is reduced by making the surface roughness of the magnetic layer very small, and thereby, a fine magnetic powder is allowed to exhibit its effect of reducing noises, so that an excellent electromagnetic transducing characteristic can be achieved, in which C/N or S/N, that is, carrier output/noise output, is excellent.

DETAILED DESCRIPTION OF THE INVENTION

Embodiments of the present invention will be specifically described below.

A magnetic recording medium of the present invention includes a magnetic layer primarily containing a ferromagnetic alloy powder and a binder on at least one surface of a non-magnetic support, and it is important that the above-mentioned ferromagnetic alloy powder has characteristics described below.

That is, in the present invention, the average major-axis length (L) of the ferromagnetic alloy powder contained in the magnetic layer is less than 0.10 μm, and preferably, is 0.03 to 0.08 μm. A fine powder within the above-mentioned range must be used in order to prepare a magnetic recording medium suitable for recording and playback in short wavelength regions. When this average major-axis length (L) is 0.10 μm or more, particulate noises are increased, and the C/N or S/N, that is, carrier output/noise output, is degraded. On the other hand, when the average major-axis length (L) is too small, although the particulate noises can be reduced, growth of crystals is likely to become unstable, and undesirable tendencies are exhibited, for example, magnetic characteristics of the ferromagnetic alloy powder are degraded, and the specific surface area is increased, so that the dispersibility is reduced. The average major-axis length is controlled by the temperature and pH of an aqueous solution during the preparation of an iron oxyhydroxide powder to become a mat rial for the ferromagnetic alloy powder in accordance with a conventional method.

In the present invention, the average major-axis length (L) of the ferromagnetic alloy powder can be determined by separating the ferromagnetic alloy powder from a piece of tape, taking a sample therefrom, and measuring the major-axis lengths of the powder in a photograph taken with a transmission electron microscope (TEM). An example of the procedure thereof will be described below. (1) A back coat layer is removed from a piece of tape by wiping with a solvent. (2) The piece of tape, in which a non-magnetic layer and an upper magnetic layer are left on a non-magnetic support, is put into a 5% aqueous solution of sodium hydroxide, followed by heating and agitating. (3) A coating film fallen off the non-magnetic support is washed with water, followed by drying. (4) This coating film is subjected to an ultrasonic treatment in methyl ethyl ketone (MEK), and the ferromagnetic alloy powder is collected by adsorption using a magnet stirrer, followed by drying. (5) The powder resulting from (4) is taken into a specific mesh, a sample for a TEM is prepared, and a photograph is taken with the TEM. (7) The major-axis lengths of the powder in the photograph are measured and an average value thereof is determined (n=100).

The average value of the crystallite diameters (d) is preferably 0.008 to 0.016 μm, and more preferably, is 0.010 to 0.015 μm. When the crystallite diameter (d) is reduced, particulate noises are reduced. However, the growth of the crystal becomes unstable, and the saturation magnetization (σs) and the magnetic anisotropy of the ferromagnetic alloy powder tend to decrease. In addition, an increase in the specific surface area is brought about, and the dispersibility may be reduced. On the other hand, when the crystallite diameter (d) is more than 0.016 μm, particulate noises are likely to increase.

The ferromagnetic alloy powder primarily contains Fe, and can contain various elements on an as needed basis. In particular, in the present invention in which the average major-axis length (L) of the ferromagnetic alloy powder is less than 0.10 μm, Co must be contained at a content within the range of 15 to 28 at % relative to Fe. When Co is contained at a content within this range, the magnetic characteristics of the ferromagnetic alloy powder can be improved, and a high C/N can be achieved. When the content of Co is less than 15 at %, the magnetic characteristics of the powder are likely to degrade, sufficient carrier output cannot be achieved, and the resulting magnetic characteristics of the magnetic recording medium are likely to change with time. On the other hand, when exceeding 28 at %, in the case where another element is further contained, distortion is lik ly to occur in the crystallite of the ferromagnetic alloy powder, the magnetic characteristics of the powder are degraded, the carrier output is reduced, the crystallite diameter is likely to increase, and particulate noises are likely to increase.

Examples of elements contained in the ferromagnetic alloy powder include, for example, rare earth elements, Y, Al and Si, other than the above-mentioned Fe and Co. However, in the present invention, Y must be contained. In general, these contained elements are present in the vicinity of the surface layer of the ferromagnetic alloy powder. Most of all, Y controls the crystal shape without changing the shape of the crystallite during a heat treatment for oxidation-reduction reaction in the manufacturing process of the ferromagnetic alloy powder, and furthermore, improves the dispersibility of the ferromagnetic alloy powder by covering the ferromagnetic alloy powder surface, and improves the magnetic characteristics and the surface properties of the magnetic recording medium.

The ferromagnetic alloy powder used in the present invention can be produced by a conventional means. A method for adding Y to this ferromagnetic alloy powder is as described below, for example. A Co-containing iron oxyhydroxide powder as a material for the ferromagnetic alloy powder is dispersed in an aqueous solution. Yttrium nitrate is added thereto, followed by further dispersion. Subsequently, the resulting suspension is maintained at 50° C. to 60° C., and is neutralized with sodium hydroxide, so that Y is precipitated on the surface of the Co-containing iron oxyhydroxide powder. This Co-containing, Y-containing iron oxyhydroxide powder is separated from the suspension by filtration, followed by washing with water, drying in air at 300° C. to 400° C., and firing, so that a Co-containing, Y-containing iron oxide powder is prepared. The resulting iron oxide powder is subjected to a reduction treatment at 400° C. to 500° C. for 10 to 15 hours in a rotary oven while a hydrogen gas stream is introduced, followed by cooling to room temperature while a nitrogen gas is introduced. Thereafter, a nitrogen gas containing 1% of oxygen is introduced, and a gradual oxidation treatment is performed for 5 to 10 hours, so that a ferromagnetic alloy powder can be prepared.

In the present invention, it is important to control the content of Y at the time of above-mentioned addition of Y by, for example, controlling the amount of addition of the above-mentioned yttrium nitrate in proportion to the specific surface area determined by calculation based on the average major-axis length and the crystallite diameter of the above-mentioned Co-containing iron oxyhydroxide powder. Consequently, it is important that Y is contained at a content in proportion to the specific surface area of the ferromagnetic alloy powder rather than the amounts of Co and Fe, and thereby, the dispersibility and the magnetic characteristics can be optimized.

The content of Y in the present invention is 22 $\mu$mol/m$^2$ or more, preferably, is 24 $\mu$mol/m$^2$ or more, and more preferably, is 27 $\mu$mol/m$^2$ or more with respect to a specific surface area (Sc) calculated from the average major-axis length (L) and the crystallite diameter (d) when the ferromagnetic alloy powder is assumed to be a circular cylinder. When less than 22 $\mu$mol/m$^2$, distortion occurs in the crystal shape of the ferromagnetic alloy powder. In addition, the amount of Y for covering is reduced, the dispersibility and the magnetic characteristics of the ferromagnetic alloy powder are degraded, and the surface properties and the magnetic characteristics of the magnetic recording medium are degraded. As a result, the carrier output is reduced, noises are increased, and the C/N is degraded. On the other hand, when excessive, the coercive force and $\sigma$s, which are the magnetic characteristics of the ferromagnetic alloy powder, may be degraded, and therefore, preferably, an upper limit of the total content of contained elements except for Co is specified to be 30 at % relative to Co and Fe.

In the present invention, the content of Y can be specified relative to the BET specific surface area (Sbet) of the ferromagnetic alloy powder. In this case, the content of Y is 20 $\mu$mol/m$^2$ or more, preferably, is 22 $\mu$mol/m$^2$ or more, and more preferably, is 24 $\mu$mol/m$^2$ or more with respect to a BET specific surface area (Sbet).

Here, a method for calculating the above-mentioned content of Y will be described below in detail.

Regarding Y contained in the ferromagnetic alloy powder, since the amount of presence of Y atoms with respect to a surface area of the powder surface (=the content with respect to a specific surface area) is in particular important, the content of Y relative to the specific area (Sc) is calculated based on the average major-axis length (L) and the crystallite diameter (d) in accordance with the following calculation method.

One particle of the powder is assumed to be a circular cylinder. The volume V1 (unit: cm$^3$) is determined by the following equation (1), wherein the crystallite diameter (d) (unit: $\mu$m) is specified to be a diameter of the base of the circular cylinder, and the average major-axis length (L) (unit: $\mu$m) is specified to be a height of the circular cylinder.

$$V1 = d^2 \pi L \times \tfrac{1}{4} \times 1/(1 \times 10^{12}) \tag{1}$$

If the specific gravity of a Co—Fe alloy is known, the number n of particles of the powder per gram (unit: particle/g) is determined by the following equation (2) based on this specific gravity D (unit: g/cm$^3$) and the volume V1 of one particle of the powder.

$$n = 1/D \times 1/V1 \tag{2}$$

Here, regarding the specific gravity (=density) D of the Co—Fe alloy, every specific gravity of this alloy used in the present invention is assumed to be the same value, and the value D=6 (unit: g/cm$^3$) determined based on the value described in a literature is used for the calculation.

One particle of the powder is assumed to be a circular cylinder, and the surface area S1 (unit: m$^2$/particle) is determined by the following equation (3).

$$S1 = \pi \times d \times (d+2L) \times \tfrac{1}{2} \times 1/(1 \times 10^{12}) \tag{3}$$

In general, a BET specific surface area Sbet (unit: m$^2$/g), that is, a measured value, is used as the surface area of the powder per gram, which is one of characteristics of the powder. On the other hand, a specific surface area Sc (unit: m$^2$/g) of the powder per gram, which is determined by calculation, is obtained by the following equation (4) resulting from the above-mentioned equations (1) to (3).

$$Sc = S1 \times n \tag{4}$$

$$Sc = S1 \times 1/D \times 1/V1$$

$$Sc = 2 \times (d + 2L) \times 1/d \times 1/L \times 1/D$$

The content of Y relative to the total amount (Fe+Co) of F and Co is represented by p(Y) (wt %). The amount of presence of Y with respect to a surface area of the magnetic powder surface is represented by Mc(Y, Sbet) (unit: $\mu$mol/m$^2$) using the BET specific surface area Sbet, and is determined by the following equation (5). The amount of presence of Y is represented by Mc(Y, Sc) (unit: $\mu$mol/m$^2$) when determined from the specific surface area Sc calculated based on the assumption that the powder is a circular cylinder, and is obtained by the following equation (6). In the above-mentioned equations, the atomic weight of Y is represented by A(Y).

$$Mc(Y, Sbet) = 10^4 \times p(Y) \times 1/A(Y) \times 1/Sbet \tag{5}$$

$$Mc(Y, Sc) = 10^4 \times p(Y) \times 1/A(Y) \times 1/Sc \tag{6}$$

Preferably, the ferromagnetic alloy powder according to the present invention further contains Al. As described above, in general, the contained elements are present in the vicinity of the surface layer of the ferromagnetic alloy powder. In particular, Al is present in the surface layer of the ferromagnetic alloy powder at a relatively high proportion. Al suppresses coalescence, keeps the crystal shape uniform, and improves the dispersibility of the ferromagnetic alloy powder during a heat treatment for oxidation-reduction reaction in the manufacturing process of the ferromagnetic alloy powder, and therefore, the magnetic characteristics and the surface properties of the magnetic recording medium are improved.

Regarding the content of Al as well, a calculated value thereof can be determined in a manner similar to that in the above-mentioned case of Y. The corresponding Mc(Al, Sbet) and Mc(Al, Sc) (each unit: $\mu mol/m^2$) are obtained by the following equations (7) and (8), respectively. In the following equations, the atomic weight of Al is represented by A(Al).

$$Mc(Al, Sbet) = 10^4 \times p(Al) \times 1/A(Al) \times 1/Sbet \qquad (7)$$

$$Mc(Al, Sc) = 10^4 \times p(Al) \times 1/A(Al) \times 1/Sc \qquad (8)$$

Regarding a method for adding Al, Al is added in the above-mentioned manufacturing process of the iron oxyhydroxide powder as a material for the ferromagnetic alloy powder. For example, aqueous sodium hydroxide and sodium aluminate are added into aqueous iron sulfate ($FeSO_4$), and an oxidation treatment is performed at 50° C. to 60° C. while air is blown into for 6 hours. Subsequently, cobalt chloride is added, followed by standing for 30 hours. The resulting precipitates are filtrated and separated, followed by washing with water and drying, so that a Co-containing, Al-containing iron oxyhydroxide powder is prepared.

As another method, in the above-mentioned manufacturing process of the Co-containing, Al-containing iron oxyhydroxide powder, the timing of addition of sodium aluminate is changed so that the addition is performed after the solution containing cobalt chloride is stood for 30 hours, carbon dioxide is blown into after the addition so as to neutralize, and thereby, precipitation onto the surface of the iron oxyhydroxide powder can be brought about.

In the present invention, it is important to control the content of Al at the time of above-mentioned addition of Al by, for example, controlling the amount of addition of the above-mentioned sodium aluminate in proportion to the specific surface area determined by calculation based on the average major-axis length and the crystallite diameter of the above-mentioned Co-containing, Al-containing iron oxyhydroxide powder predicted by a preliminary experiment and the like. Consequently, in a manner similar to that described above, optimization of the dispersibility and the magnetic characteristics can be achieved by Al being contained at a content in proportion to the specific surface area (Sc) of the ferromagnetic alloy powder as well. In the ferromagnetic alloy powder used in the present invention, preferably, the content of Al is 27 to 45 $\mu mol/m^2$, and more preferably, is 27 to 40 $\mu mol/m^2$ relative to the specific surface area (Sc). When less than 27 $\mu mol/m^2$, coalescence of the ferromagnetic alloy powder is likely to occur, the dispersibility is likely to degrade, and the surface roughness and the magnetic characteristics of the magnetic recording medium tend to degrade. Therefore, the carrier output may be reduced, and noises may be increased. On the other hand, when exceeding 45 $\mu mol/m^2$, the BET specific surface area (Sbet) of the practical ferromagnetic alloy powder tends to significantly increase relative to the specific surface area (Sc). In particular, since the dispersibility is degraded, and the surface roughness and the magnetic characteristics of the medium tend to degrade, the carrier output may be reduced, and noises may be increased.

In the present invention, the content of Al can be specified relative to the BET specific surface area (Sbet) of the ferromagnetic alloy powder. In this case, preferably, the content of Al is 22 to 38 $\mu mol/m^2$ with respect to a BET specific surface area (Sbet), and more preferably, is 22 to 34 $\mu mol/m^2$.

In the present invention, it is essential that the ferromagnetic alloy powder contained in the magnetic layer satisfies the above-mentioned condition. In this manner, the effects of the present invention can be achieved. However, preferably, the following factors are further satisfied.

Regarding the ferromagnetic alloy powder according to the present invention, preferably, the saturation magnetization σs is 90 to 145 $Am^2/kg$, and more preferably, the ratio of the residual magnetization σr to the saturation magnetization σs, σr/σs, is 0.51 or more. When the values of σs and σr/σs are specified to be within these range, the magnetic characteristics of the medium are further improved.

Regarding the surface roughness of the magnetic layer, preferably, the center line average roughness Ra is 1 to 2.5 nm, the ten-point-average roughness Rz is 10 to 25 nm, and the maximum height Rmax is 15 to 30 nm. More preferably, Ra is 1 to 2 nm, Rz is 10 to 20 nm, and Rmax is 15 to 25 nm. When the surface roughness exceeds these range, the spacing tends to increase, the carrier output tends to decrease, and noises tend to increase. When the surface roughness is less than these ranges, the reliability may be reduced.

When the magnetic recording medium of the present invention is a so-called multilayer medium including the non-magnetic layer between the magnetic layer and the non-magnetic support, the average thickness of the magnetic layer is preferably 0.03 to 0.30 $\mu m$. By specifying the average thickness of the magnetic layer within this range, it is advantageous from the viewpoint of saturation recording and short wavelength recording to use a ferrite head or an MIG head as a recording, replay head. In general, when the thickness of the magnetic layer is one-half to one-quarter the recording wavelength, the saturation recording can be more effectively performed, and an optimum thickness is further reduced with a decrease in the recording wavelength. In particular, reduction of the thickness is effective for reducing noises. When this average thickness is larger than one-half the recording wavelength, the saturation recording becomes impossible, and in addition, an influence is exerted on modulation systems, e.g. PRML (Partial Response Maximum Likelihood) and RLL (Run Length Limited), so that the carrier output may be reduced. On the other hand, when the average thickness is less than 0.03 $\mu m$, the number of particles of the ferromagnetic alloy powder is reduced in the thickness direction of the magnetic layer, the magnetic flux density is reduced, and the carrier output is unlikely to be achieved.

The squareness ratio (residual magnetic flux density/saturation magnetic flux density) of the magnetic layer according to the present invention is preferably 0.88 or more in the direction of magnetic recording by the recording, replay head, that is, in the longitudinal direction when the magnetic recording medium of the present invention is a magnetic tape, and more preferably, is 0.90 or more. At the same time, the degree of orientation in the longitudinal direction of the magnetic tape (the squareness ratio in the longitudinal direction/the squareness ratio in the width direction) is preferably 3.0 or more, and more preferably, is 3.2 or more. By increasing the squareness ratio and the degree of orientation, the carrier output can be increased, noises can be reduced, and the electromagnetic transducing characteristic, e.g. C/N, can be further improved.

When this squareness ratio is brought close to 1.0, the electromagnetic transducing characteristic becomes excellent. However, when less than 0.88, the resulting characteristic becomes poor. When the degree of orientation is increased, excellent effects are exerted, for example, the carrier output is increased, and noises are reduced. However, when less than 3.0, the arrangement of the ferromagnetic alloy powder is disturbed, the carrier output is reduced, noises are increased, and degradation of the electromagnetic transducing characteristic, e.g. C/N, is likely to occur. In general, the upper limit is believed to be in the order of 5.

The coercive force in the longitudinal direction of the magnetic recording medium of the present invention is preferably 165 to 250 kA/m, and more preferably, is 170 to 250 kA/m. The coercive force within this range is suitable for high-recording-density recording. When exceeding 250 kA/m, writing may become insufficient depending on the performance of the recording head. On the other hand, when less than 165 kA/m, in particular, the carrier output in short wavelength regions may be reduced.

The residual magnetic flux density in the longitudinal direction of the magnetic recording medium of the present invention is preferably 200 to 400 mT, and more pr ferably, is 250 to 370 mT. When the ratio of the ferromagnetic alloy powder to the binder is increased, and this residual magnetic flux density is increased to more than 400 mT, durability and running ability may be degraded. On the other hand, when less than 200 mT, the carrier output may be reduced, and the C/N may be degraded.

When the magnetic recording medium of the present invention is used in a system equipped with an MR head as a replay head, the residual magnetic flux density is necessary to some extent. However, when the residual magnetic flux density is too large, the MR element is saturated, and becomes less sensitive to change in the magnetic field. The half-value width (PW50) at the peak portion of an isolated waveform of the replay signal must be reduced. Consequently, in order to make use of the merits of the MR head, the average thickness of the magnetic layer is specified to be 0.03 to 0.30 $\mu$m, and preferably, be 0.04 to 0.10 $\mu$m, and in addition, the residual magnetization is specified to be 10 to 35 mT·$\mu$m. In this manner, the saturation of this MR element can be avoided, PW50 of the isolated waveform can be reduced, and therefore, high-recording-density magnetic recording medium can be provided.

Furthermore, regarding the magnetic recording medium of the present invention, SFD (Switching Field Distribution) in the longitudinal direction is also noted. The SFD is a scale for a velocity of the magnetic flux change (response) relative to the magnetic field strength in the magnetic recording medium. The SFD is also a scale for variations in the dimension of the ferromagnetic alloy powder. It is ideal that the SFD gets closer and closer to zero. When the ferromagnetic alloy powder is uniform, and response is excellent, the transfer rate of the recording signal can be further increased. Regarding the measurement of the magnetic characteristics of the magnetic recording medium, in general, a hysteresis magnetization curve is provided while the horizontal axis indicates the magnetic field (Hf), and the vertical axis indicates the magnetic flux (Mf). Furthermore, Mf is differentiated with respect to Hf, and a graph having the horizontal axis indicating (Hf) and the vertical axis indicating the differential value (dMf/dHf) can be provided. The resulting graph is in the shape of a mountain in which the differential value (dMf/dHf) is at a maximum in the vicinity of the coercive force (Hc) of the magnetic recording medium, and the peak spreads toward the bottom. Regarding this mountain-like portion, the half-value width ($\Delta$Ha) of (dMf/dHf) at the coercive force (Hc), that is, $\Delta$Hf at 50% of the maximum differential value, can be determined, and SFD=($\Delta$Ha/Hc) can be determined from this half-value width ($\Delta$Ha) and the coercive force (Hc). This SFD takes on different values depending on the rate of increase in the magnetic field (sweep rate) during the measurement, and takes on smaller value with a decrease in the rate of increase. When the rate of increase is brought close to zero, the SFD converges to a certain constant value. Consequently, the value of the SFD in the present invention is an SFD correction value at a sweep rate of zero, determined by interpolation based on the actually measured SFD values at different two sweep rates. In the present invention, the SFD correction value determined by this method is preferably 0.30 or less, and more preferably, is 0.27 or less. When the SFD correction value exceeds 0.30, response is poor, and a noise is likely to be high.

Known films of, for example, polyesters, e.g. polyethylene terephthalate (PET) and polyethylene naphthalate (PEN), polyamide, polyimide and poly(amide-imide), can be used as the non-magnetic support used in the present invention.

In the case where the magnetic recording medium of the present invention is a multilayer medium, the film thickness of the non-magnetic layer is preferably 0.5 to 2.0 $\mu$m in terms of average thickness, and more preferably, is 0.5 to 1.0 $\mu$m. When this average film thickness is less than 0.5 $\mu$m, the surface properties of the magnetic layer is degraded under the influence of a filler of the non-magnetic support, and at th same time, friction may be increased, and durability and running ability may be degraded. On the other hand, when exceeding 2.0 $\mu$m, the thickness is likely to become non-uniform during application of a coating film, and therefore, the coating condition becomes severe, and the surface smoothness is likely to degrade.

The non-magnetic layer may contains a resin and, if necessary, a granular or needlelike non-magnetic powder, e.g. hematite, titanium oxide and goethite, a lubricant and a conductive material, e.g. carbon black. The above-mentioned non-magnetic powder is preferably specified to be a non-magnetic needle powder. This non-magnetic needle powder preferably has an average major-axis length of 0.05 to 0.10 $\mu$m, and preferably has a needle ratio (ratio of the average major-axis length to the average minor-axis length) of 3 to 8. When the average major-axis length and the needle ratio of the non-magnetic needle powder subjected to use is specified to be within these ranges, the surface properties and the reliability can become mutually compatible.

The sort of the non-magnetic needle powder in the non-magnetic layer is appropriately selected on an as needed basis, and preferably, needle goethite is used. When the average major-axis length thereof is specified to be within the above-mentioned range of 0.05 to 0.10 $\mu$m, the dispersibility becomes excellent, the surface roughness of the non-magnetic layer and the magnetic layer of the present invention become excellent, and an excellent C/N characteristic can be exhibited.

In the case of the magnetic tape, a magnetic layer and, in accordance with desires, a back coat layer may be provided in addition to the non-magnetic layer. The back coat layer is provided for improving running stability, preventing charging of the medium, adjusting lightproof property and the like. Preferably, the back coat layer contains 20% to 80% by weight of carbon black. When the content of the carbon black is too low, the effects of preventing charging and shielding against light tend to be reduced, and furthermore, the running stability is likely to degrade. When the light-transmittance is high, a problem occurs in a system in which the tape end is detected by change in the light-transmittance. On the other hand, when the content of the carbon black is excessive, strength is reduced because of the shortage of the binder in the back coat layer, and running durability are likely to degrade. The carbon black can be appropriately selected from common carbon black, and preferably, the average particle diameter thereof is 0.005 to 0.3 μm. More preferably, an inorganic pigment, an organic pigment, a lubricant and the like is appropriately contained in order to increase the reliability of the back coat layer.

Examples of binders used for the magnetic layer, the non-magnetic layer and the back coat layer of the present invention include, for example, a thermoplastic resin, a thermosetting or reactive resin, and an electron-radiation-curing resin. Combinations thereof are appropriately selected in accordance with the characteristics of media and process conditions, and are applied to use.

A method for manufacturing the magnetic recording medium of the present invention will be described in detail.

A manufacturing process for a magnetic paint of the magnetic recording medium of the present invention includes, on an as needed basis, a step of kneading all of or a part of materials prepared to be used, a step of mixing and diluting the resulting kneaded materials with an organic solvent or a water-based solvent and a part of the above-mentioned materials on an as needed basis, a step of dispersing with a dispersion device, and if necessary, a step of adding a part of the above-mentioned materials during the dispersion, followed by mixing and further dispersion, and a step of mixing the organic solvent or the water-based solvent and a part of the above-mentioned materials on an as needed basis. A series of steps can be constructed depending on the purpose by arranging these steps in that order or in a different order, while some steps may overlap.

In the above-mentioned dispersion step, dispersion media selected from glass beads made of $SiO_2$ (true specific gravity: 2 to 3.2) or the like, ceramic beads made of $ZrO_2$ (true specific gravity; 6), $TiO_2$ (true specific gravity: 4) or the like, iron balls (true specific gravity: 6), etc., are filled in a dispersion device, and the magnetic paint is introduced into the dispersion device during operation, so that a dispersion treatment is performed.

In the dispersion step of the magnetic paint according to the present invention, optimum media can be appropriately selected from the above-mentioned dispersion media on an as needed basis. However, preferably, the ceramic beads having an average particle diameter of 0.1 to 0.8 mm and a true specific gravity of 4 or more are used. More preferably, the ceramic beads are $ZrO_2$ having an average particle diameter of 0.1 to 0.5 mm. When the average particle diameter and the true specific gravity of the dispersion media are specified to be within the above-mentioned range, the dispersion media are small, the number thereof is increased, and the weight on a dispersion media particle basis is increased. As a result, the dispersion strength is improved, the dispersibility of the ferromagnetic alloy powder in the magnetic paint becomes excellent, and the electromagnetic transducing characteristic can be further improved.

Soluble ions in the dispersion media to be used are sodium ($Na^+$) and calcium ($Ca^{2+}$). Preferably, each of the contents is 100 ppm or less, and more preferably, the content of the total ions is 100 ppm or less. When the contents of the soluble ions are specified to be within the above-mentioned ranges, reactions of the ferromagnetic alloy powder in the magnetic paint or other materials with the soluble ions become unlikely to occur, and therefore, improvement of the reliability can be in particular achieved.

In the dispersion step of the magnetic paint according to the present invention, the operating condition of the above-mentioned dispersion device can be appropriately selected in accordance with desires. However, the operating peripheral velocity of the dispersion device is preferably specified to be 8 m/s or more, and more preferably, be 8 to 15 m/s. Regarding the operating condition, when the peripheral velocity is specified to be 8 m/s or more, movements of the dispersion media are accelerated, dispersion energy is increased, and therefore, the dispersion strength can be improved. At this time, the temperature of the magnetic paint is increased with an increase in the peripheral velocity. Consequently, even when the peripheral velocity is 15 m/s or less, more preferably, adjustment of the cooling efficiency and the peripheral velocity is performed in order to avoid denaturation of the materials contain d in the magnetic paint. Preferably, the temperature during the dispersion of the magnetic paint is 0 to 60° C., and more preferably, is 10° C. to 40° C.

A manufacturing process for a magnetic layer of the present invention can be composed of appropriately selected steps including, on an as needed basis, a step of applying the magnetic paint on the non-magnetic support, although on the nonmagnetic layer after the non-magnetic layer is provided by coating or at the same time as the provision of the non-magnetic layer in the case of the multilayer medium, a step of preliminarily orientating and drying, a step of formally orientating, a step of formally drying, a step of processing and the like in that order, while some steps may overlap.

In the above-mentioned application step, preferably, the magnetic paint is applied by coating after being subjected to an ultrasonic treatment with an ultrasonic dispersion device. When the volume of the ultrasonic dispersion device is represented by Mus, and the flow rate of the magnetic paint passing through the ultrasonic dispersion device is represented by F, more preferably, the time T elapsed before application of the magnetic paint after passing through the ultrasonic dispersion device satisfies the relationship represented by a formula, $T < 500 \times Mus/F$. Since the ultrasonic dispersion device is used, proper energy is applied to particles in the magnetic paint, the yield value of the magnetic paint is reduced, particles are dispersed again immediately before application, and therefore, smoothing during application can be accelerated. As a result, the surface properties are improved, and furthermore, the magnetic characteristics of the medium, in particular, the degree of orientation and the squareness ratio, are improved.

In the above-mentioned step of formally orientating, a permanent magnet, an electromagnet or the like can be used as the orientation magnet. However, preferably, the electromagnet is used, and preferably, orientation is performed in a magnetic field 2.5 times or larger than the coercive force of the ferromagnetic alloy powder in the magnetic paint. After the magnetic paint is applied, more preferably, the resulting coating is allowed to reach the magnetic field of the electromagnet within 10 seconds while being in the undried condition. Further preferably, blowing is performed into the electromagnet, and drying is performed in the magnetic field. When orientation is performed as described above, the squareness ratio and the degree of orientation of the magnetic layer are further improved.

Regarding provision of the nonmagnetic layer by coating in the case where the magnetic recording medium of th present inventi n is a multilayer medium, when the magnetic layer is provided on the non-magnetic layer, either of so-called wet-on-wet coating, in which the non-magnetic layer is in the wet condition, and the magnetic paint is provided there on, or so-called wet-on-dry coating, in which the non-magnetic layer is at least in the dry condition, and the magnetic paint is provided there on, can be selected. Preferably, the wet-on-dry coating is used because of having an advantage in preventing interfacial fluctuations between a plurality of layers.

When the magnetic layer is provided by the wet-on-dry coating, the solvent in the magnetic paint may attack the non-magnetic layer having been provided, or may penetrate into the non-magnetic layer and swell the non-magnetic layer, so that the surface properties of the non-magnetic layer may be degraded, and the interfacial fluctuation between the non-magnetic layer and the magnetic layer may be increased. As a method for overcoming such a problem, preferably, some energy is applied to the binder contained in the non-magnetic layer, and cross-linking (curing) is brought about in order to enhance the solvent resistance (flux resistance) of the non-magnetic layer surface.

A heat curing method, in which a coating film of the non-magnetic layer to be cured is allowed to contain a heat-reactive cross-linking agent, followed by drying, and subsequently, standing is performed at a predetermined temperature for a predetermined time so as to cure, can be used as the above-mentioned curing means. However, more preferably, an electron-radiation-curing method described below is adopted as a means for reducing the curing time to a minimum so that the non-magnetic layer and the magnetic layer can be provided online and for avoiding heat deformation due to folding or the weight because the support provided with the non-magnetic layer by coating is of long lengths or in the shape of a heavy roll.

That is, more preferably, the non-magnetic layer is allowed to contain an electron-radiation-curing resin having at least an electron-beam-functional group, the electron-beam-functional group undergoes reaction to cross-link the resin by electron beam irradiation, and therefore, the non-magnetic layer is cured. According to this method, since the electron beam irradiation is simply required, the non-magnetic layer can be cured in a short time, and heat deformation can be reduced to a minimum. Methatrylic double bonds are introduced in thermoplastic resins by a conventional method, so that the resin is modified to be sensitive to an electron beam, and the resulting resin can be used as the resin having an electron-beam-functional group. Examples of thermoplastic resins include, for example, vinyl chloride copolymers and polyurethane resins, methacrylic resins, polyester resins, acrylonitrile-butadiene copolymers, polyamide resins, poly(vinyl butyral), nitrocellulose, styrene-butadiene copolymers, poly(vinyl alcohol) resins, acetal resins, epoxy resins, phenoxy resins, polyether resins, multifunctional polyethers, e.g. polycaprolactone, polyamide resins, polyimide resins, phenol resins, polybutadiene elastomers, chlorinated rubber, acrylic rubber, isoprene rubber and epoxy-modified rubber. The content of the electron-beam-functional group in hydroxy groups thereof is 1% to 40% by mol, preferably, is 10% to 30% by mol in consideration of stability, electron-radiation-curing property and the like during preparation. In particular, regarding the vinyl chloride copolymer, when monomers are reacted to bring about 1 to 20 functional groups per molecule, and preferably, 2 to 10 functional groups, an electron-radiation-curing resin having excellent dispersibility and curing property can be prepared. Furthermore, it is preferable to have $—COOH$, $—SO_3M$, $—OSO_3M$, $—OPO_3M$, $—PO_3M$, $—PO_2M$, $—N^+R_3Cl^-$, $—NR_2$ (where M denotes H or an alkali metal, and R denotes H, methyl or ethyl) and other acidic polar groups, basic polar groups and the like at the end and in the side chain. Inclusion of them is suited for improving the dispersibility.

The amount of irradiation of electron beam is represented by absorbed doses of the non-magnetic layer, and a larger value indicates a higher degree of curing. Preferably, the amount of irradiation is 2.5 to 20 Mrad, more preferably, is 3.5 to 20 Mrad, and further preferably, is 4 to 18 Mrad. When this amount of irradiation is too small, curing is insufficient, and when the magnetic layer is provided, the non-magnetic layer is attacked by the solvent in the magnetic paint. On the other hand, when excessive, the structure of the resin and the non-magnetic support may be broken, and therefore, the reliability is likely to degrade.

When the magnetic layer is provided by the wet-on-dry coating, preferably, the concentration of the solids in the magnetic paint is adjusted to be 5% to 20% by weight in order to prevent occurrence of coating streaks and to perform sufficient orientation treatment.

The ferromagnetic alloy powder of the magnetic recording medium according to the present invention can be prepared in accordance with a conventional method. In the magnetic recording medium of the present invention, known materials can be appropriately used in accordance with the purposes without any restriction except for the above-mentioned materials, and regarding the manufacturing method therefor, known steps can be appropriately used in accordance with the purposes without any restriction.

As described above, according to the present invention, the c ating-type high-recording-density magnetic recording medium having excellent magnetic characteristics and surface properties, an excellent electromagnetic transducing characteristic especially in short wavelength regions and high reliability can be provided.

EXAMPLES

The present invention will be described below in detail with reference to specific examples. However, the present invention is not limited to the following examples. In the following description, every number shown on the right-hand part of the following composition tables is on a part by weight basis.

Methods for measuring various properties shown below will be described.

(Magnetic Characteristics)

Characteristics in the longitudinal direction of the tape were measured with a VSM manufactured by TOEI INDUSTRY CO., LTD. The coercive force and the SFD measurement sweep rate are as described below.

Applied magnetic field: 1.2 MA/m

Magnification range: 400 kA/m

Waiting Time/Time constant=0.1/0.03

Sweep velocity: 745 kA/m per minute, 306 kA/m per minute

SFD correction value: a value at a sweep rate of zero, determined by interpolation based on two sw ep rate values actually measured under the above-mentioned two conditions (Surface Roughness)

Ra, Rz and Rmax were measured with a "TALYSTEP system" (manufactured by Tayler-Hobson Corp.) based on JIS B0601. Conditions of the measurement device are filter: 0.38 to 9.00 Hz, contact probe: 0.1×2.5 µm stylus, contact probe pressure: 2 mg, measurement speed: 0.03 mm/sec and measurement length: 500 µm.

(Carrier Output, Noise Output and C/N Characteristic)

A single signal of a frequency of 27 MHz was recorded and replayed with a DDS-4 data drive. A carrier output of 27 MHz and a carrier output of 28 MHz as a noise output different by 1 MHz were measured, and the difference therebetween was shown as the C/N characteristic indicated in terms of dB. These measurements of the carrier output, the noise output and the C/N characteristic were performed with respect to each of samples resulting from the following Examples and Comparative examples. The measurement results are shown on a relative value basis where each value in Comparative example 1 is assumed to be 0 dB. The measurement conditions are as described below.

measurement frequency: 27 MHz, track width; 5.4 µm, track density 4.7 kbpi, recording wavelength: 0.51 µm and linear recording density: 81 kbpi

Example 1

A non-magnetic layer paint, a magnetic paint and a back coat paint were prepared in accordance with the following composition table.

Non-Magnetic Layer Paint

| | |
|---|---|
| acicular non-magnetic powder (goethite, specific gravity: about 4) | 80 |
| average major-axis length: 0.10 µm, | |
| average minor-axis length: 0.013 µm | |
| BET specific surface area: 60 m²/g, pH: 8.5 | |
| bulk density: 0.65 g/cm³ | |
| surface treatment: Al = 0.5% by weight | |
| carbon black | 20 |
| average particle diameter: 0.017 µm, | |
| BET specific surface area: 250 m²/g | |
| DBP oil absorption: 70 cc/100 g, pH: 7.4 | |
| aluminum oxide (Morse hardness: 9) | 5 |
| average particle diameter: 0.2 µm, | |
| BET specific surface area: 9.5 m²/g | |
| [HIT-50 manufactured by Sumitomo Chemical Co., Ltd.] | |
| dispersing agent (phenylphosphonic acid) | 3 |
| dispersing agent (phosphoric acid ester) | 1 |
| [RE-610 manufactured by TOHO CHEMICAL INDUSTRY CO., LTD.] | |
| electron-radiation-curing vinyl chloride resin [NV 30%] | 38 |
| vinyl chloride-epoxy-containing monomer copolymer | |
| average degree of polymerization: 310 | |
| epoxy content: 3% by weight | |
| S (sulfur) content: 0.6% by weight | |
| acrylic structure content: 6 units/molecule | |
| Tg: 60° C. | |
| electron-radiation-curing polyurethane resin [NV 35%] | 25 |
| phosphorous compound-hydroxy-containing polyester polyurethane | |
| Mn (number average molecular weight): 26,000 | |
| acrylic structure content: 6 units/molecule | |
| Tg: 16° C. | |
| methyl ethyl ketone | 115 |
| toluene | 115 |
| cyclohexanone | 98 |
| (subtotal | 500) |

A part of the above-mentioned components were kneaded, and thereafter, were dissolved in order that the above-mentioned composition was achieved. Dispersion was performed for a residence time of 100 minutes in a horizontal sand grinder mill (peripheral velocity: 8 m/s) filled in with zirconia beads having a center particle diameter of 0.5 mm. Subsequently, the following composition was added, and therefore, a non-magnetic layer paint was prepared.

| | |
|---|---|
| butyl stearate | 1 |
| stearic acid | 2 |
| stearic acid amide | 1 |
| methyl ethyl ketone | 34 |
| toluene | 34 |
| cyclohexanone | 28 |
| (total | 600) |

Magnetic paint

| | |
|---|---|
| ferromagnetic alloy powder | 100 |
| (ferromagnetic alloy powder shown in Table 2: a-1) | |
| dispersing agent (phosphoric acid ester) | 3 |
| [RE-610 manufactured by TOHO CHEMICAL INDUSTRY CO., LTD.] | |
| carbon black | 0.5 |
| average particle diameter: 0.03 µm, | |
| BET specific surface area: 70 m²/g | |
| DBP oil absorption: 48 ml/100 g, pH: 7.0 | |
| aluminum oxide | 10 |
| average particle diameter: 0.08 µm | |
| [HIT-102 manufactured by Sumitomo Chemical Co., Ltd.] | |
| vinyl chloride resin | 15 |
| [MR-110 manufactured by ZEON CORPORATION] | |
| polyester polyurethane resin [NV 30%] | 10 |
| polar group: containing sodium sulfonate | |
| [UR-8300 manufactured by Toyobo Co., Ltd.] | |
| methyl ethyl ketone | 89 |
| toluene | 89 |
| cyclohexanone | 89 |
| (subtotal | 405.5) |

A part of the above-mentioned components were kneaded, and thereafter, were dissolved in order that the above-mentioned composition was achieved. Dispersion was performed for a residence time of 100 minutes in a horizontal sand grinder mill (peripheral velocity: 8 m/s) filled in with zirconia beads having a center particle diameter of 0.5 mm. Subsequently, the following composition was added, and therefore, a magnetic layer paint was prepared.

| | |
|---|---|
| butyl stearate | 1 |
| stearic acid | 1 |
| methyl ethyl ketone | 35 |
| toluene | 35 |
| cyclohexanone | 328 |
| (total | 805.5) |

Coronate L (solids: 75%) manufactured by NIPPON POLYURETHANE INDUSTRY CO., LTD. was added as a cross-linking agent to the magnetic paint immediately before application of coating. The amount of addition was 33% by weight relative to the resin content in the paint.

Th resulting magnetic paint had a solid concentration of 16.1% by weight.

Back Coat Paint

| | |
|---|---|
| carbon black (average primary particle diameter: 0.017 µm) | 100 |
| dispersing agent | 2 |
| abrasives [granular α-iron oxide] (average primary particle diameter: 0.10 µm) | 5 |
| nitrocellulose [NV 70%] | 85 |
| polar group-containing polyester polyurethane resin [NV 30%] | 85 |

-continued

| | |
|---|---|
| methyl ethyl ketone | 210 |
| toluene | 240 |
| cyclohexanone | 73 |
| (subtotal | 800) |

A part of the above-mentioned components were kneaded, and thereafter, were dissolved in order that the above-mentioned composition was achieved. Subsequently, dispersion was performed, the following composition was added, and furthermore, dispersion was performed, so that a back coat paint was prepared.

| | |
|---|---|
| nitrocellulose [NV 70%] | 20 |
| polar group-containing polyester polyurethane resin [NV 40%] | 27 |
| methyl ethyl ketone | 420 |
| toluene | 420 |
| cyclohexanone | 113 |
| (total | 1,800) |

Coronate L (solids: 75%) manufactured by NIPPON POLYURETHANE INDUSTRY CO., LTD. was added as a cross-linking agent to the back coat paint immediately before application of coating. The amount of addition was 20% by weight relative to the resin content in the paint.

The non-magnetic layer paint was applied on an aromatic polyamide (PA) film (Young's modulus: longitudinal direction/width direction=11.5/13.5 GPa, magnetic surface side Ra=1.5 nm, back Ra=5.8 nm) having a thickness of 3.6 μm at a coating speed of 150 m/min with an extrusion type die nozzle coater. Drying was performed, followed by calendaring. Subsequently, the non-magnetic layer was irradiated with an electron beam in an atmosphere of nitrogen so as to cure. A magnetic paint was filtrated with a filter having a 99.9% filtration accuracy of 0.5 μm for a residence time of 15 minutes, and was subjected to ultrasonic dispersion. The resulting magnetic paint was applied within 5 minutes thereafter onto the cured non-magnetic layer with an extrusion type die nozzle coater. An orientation treatment was performed within 6 seconds after application of the magnetic paint with a two-gang electromagnet of 700 mT in series in an oven, and drying was performed by blowing into the electromagnet at about 50° C. Subsequently, a formal drying step was performed at 100° C. to 110° C. so as to provide a magnetic layer, and the resulting stuff was processed with a calender. Furthermore, the back thereof was coated with the back coat paint, followed by drying and taking up. In this manner, the magnetic layer of 0.17 μm thickness, the non-magnetic layer of 0.9 μm thickness and the back coat layer of 0.5 μm were formed on the film. This roll was stood for 24 hours or more, and subsequently, was stood for 24 hours or more in an environment at 60° C. After standing to cool, the resulting roll was slit so as to prepare a tape sample having a width of 3.80 mm. This was specified to be Example 1. The conditions for the electron beam irradiation and calendering are as described below.

electron beam irradiation condition: electrocurtain type electron beam accelerator acceleration voltage: 250 keV electrode current: 200 mA absorbed dose: 6 Mrad processing condition: seven-nip calender with steel and elastic rolls steel contact surface: non-magnetic layer and magnetic layer side roll temperature: 100° C.

linear pressure: 3,430 N/cm speed: 150 m/min

Regarding the surface roughness of the resulting non-magnetic layer, Ra/Rz/Rmax was 4.1/34.0/38.0 nm before the processing, and was 1.9/19.1/23.8 nm after the processing. Regarding the surface roughness of the back coat layer, no change was observed between before and after the processing, and Ra/Rz/Rmax was 13.0/110/130 nm. Regarding samples described below, samples were prepared using similar non-magnetic layers and back coat layers.

Examples 2 to 4

Examples 2 to 4 were prepared in a manner similar to that in Example 1 except that the thickness of the magnetic layer in Example 1 was changed as shown in the following Table 1, and the solid concentration of the magnetic paint was changed as described below by adjustment.

TABLE 1

| | Magnetic layer thickness (μm) | Solid concentration (wt %) |
|---|---|---|
| Example 2 | 0.13 | 13 |
| Example 3 | 0.08 | 8 |
| Example 4 | 0.05 | 6 |

Examples 5 to 15 and Comparative Examples 1 to 4

Samples were prepared in a manner similar to that in Example 3 except that the ferromagnetic alloy powder of the magnetic paint was changed to a-2 to a-12 or b-1 to b-4 shown in the following Tables 2 and 3, and were specified to be Examples 5 to 15 and Comparative examples 1 to 4, respectively.

The principal characteristics of the ferromagnetic alloy powders a-1 to a-12 and b-1 to b-4 used in the above-mentioned Examples and Comparative examples are shown in the following Tables 2 and 3, and the evaluation results of the prepared samples are shown in the following Tables 4 and 5, respectively.

TABLE 2

| | | a-1 | b-1 | a-2 | a-3 | a-4 | a-5 | a-6 | a-7 |
|---|---|---|---|---|---|---|---|---|---|
| at % | Co/Fe | 24 | 24 | 24 | 20 | 24 | 24 | 24 | 24 |
| | Al/(Fe + Co) | 9.8 | 8.4 | 9.8 | 9.8 | 9.8 | 9.8 | 9.8 | 9.8 |
| | Y/(Fe + Co) | 7.9 | 6.8 | 7.9 | 9.8 | 7.9 | 7.9 | 7.0 | 6.2 |
| wt % | Co/Fe | 25 | 25 | 25 | 21 | 25 | 25 | 25 | 25 |
| | Al/(Fe + Co) | 4.7 | 4.0 | 4.7 | 4.7 | 4.7 | 4.7 | 4.7 | 4.7 |
| | Y/(Fe + Co) | 12 | 11 | 12 | 15 | 12 | 12 | 11 | 10 |

TABLE 2-continued

|  |  | a-1 | b-1 | a-2 | a-3 | a-4 | a-5 | a-6 | a-7 |
|---|---|---|---|---|---|---|---|---|---|
| Average dimension | Longitudinal axis length L ($\mu$m) | 0.075 | 0.100 | 0.090 | 0.055 | 0.075 | 0.060 | 0.075 | 0.075 |
|  | Crystallite diameter d ($\mu$m) | 0.0145 | 0.0170 | 0.0150 | 0.0115 | 0.0130 | 0.0110 | 0.0145 | 0.0150 |
| Specific surface area | Sc: Calculation (m$^2$/g) | 50 | 43 | 48 | 64 | 56 | 64 | 50 | 49 |
|  | Sbet: BET (m$^2$/g) | 56 | 48 | 53 | 72 | 64 | 70 | 56 | 56 |
|  | Sbet/Sc | 1.1 | 1.1 | 1.1 | 1.1 | 1.1 | 1.1 | 1.1 | 1.1 |
| Al ($\mu$mol/m$^2$) | Sc | 35 | 35 | 36 | 27 | 31 | 27 | 35 | 35 |
|  | Sbet | 31 | 31 | 33 | 24 | 27 | 25 | 31 | 30 |
| Y ($\mu$mol/m$^2$) | Sc | 28 | 28 | 29 | 27 | 25 | 22 | 25 | 22 |
|  | Sbet | 25 | 25 | 26 | 24 | 22 | 20 | 22 | 20 |
| Magnetic characteristic | Coercive force Hc (kA/m) | 190 | 190 | 190 | 181 | 185 | 170 | 190 | 185 |
|  | Saturation magnetization $\sigma$s (Am$^2$/kg) | 143 | 143 | 143 | 115 | 130 | 120 | 141 | 141 |

TABLE 3

|  |  | b-2 | b-3 | a-8 | a-9 | b-4 | a-10 | a-11 | a-12 |
|---|---|---|---|---|---|---|---|---|---|
| at % | Co/Fe | 24 | 10 | 16 | 28 | 30 | 24 | 24 | 24 |
|  | Al/(Fe + Co) | 9.2 | 9.8 | 9.8 | 9.9 | 7.8 | 6.3 | 13 | 14 |
|  | Y/(Fe + Co) | 5.3 | 7.9 | 7.9 | 7.9 | 6.3 | 7.9 | 7.9 | 7.9 |
| wt % | Co/Fe | 25 | 11 | 17 | 30 | 32 | 25 | 25 | 25 |
|  | Al/(Fe + Co) | 4.4 | 4.7 | 4.7 | 4.7 | 3.7 | 3.0 | 6.0 | 6.5 |
|  | Y/(Fe + Co) | 8.4 | 13 | 13 | 12 | 10 | 12 | 12 | 12 |
| Average dimension | Longitudinal axis length L ($\mu$m) | 0.075 | 0.075 | 0.075 | 0.075 | 0.075 | 0.075 | 0.075 | 0.075 |
|  | Crystallite diameter d ($\mu$m) | 0.0160 | 0.0140 | 0.0145 | 0.0150 | 0.0165 | 0.0150 | 0.0145 | 0.0150 |
| Specific surface area | Sc: Calculation (m$^2$/g) | 46 | 52 | 50 | 49 | 45 | 49 | 50 | 49 |
|  | Sbet: BET (m$^2$/g) | 52 | 59 | 54 | 54 | 52 | 56 | 59 | 62 |
|  | Sbet/Sc | 1.1 | 1.1 | 1.1 | 1.1 | 1.2 | 1.1 | 1.2 | 1.3 |
| Al ($\mu$mol/m$^2$) | Sc | 35 | 33 | 35 | 36 | 31 | 23 | 44 | 49 |
|  | Sbet | 31 | 30 | 32 | 32 | 26 | 20 | 38 | 39 |
| Y ($\mu$mol/m$^2$) | Sc | 20 | 27 | 28 | 29 | 25 | 29 | 28 | 29 |
|  | Sbet | 18 | 24 | 26 | 26 | 21 | 25 | 24 | 23 |
| Magnetic characteristic | Coercive force Hc (kA/m) | 180 | 156 | 180 | 187 | 180 | 185 | 190 | 187 |
|  | Saturation magnetization $\sigma$s (Am$^2$/kg) | 135 | 110 | 139 | 140 | 130 | 138 | 143 | 141 |

TABLE 4

|  |  | Example 1 | Example 2 | Example 3 | Example 4 | Comparative example 1 | Example 5 | Example 6 | Example 7 | Example 8 | Example 9 |
|---|---|---|---|---|---|---|---|---|---|---|---|
| Ferromagnetic alloy powder |  | a-1 | a-1 | a-1 | a-1 | b-1 | a-2 | a-3 | a-4 | a-5 | a-6 |
| Magnetic layer thickness ($\mu$m) |  | 0.17 | 0.13 | 0.08 | 0.05 | 0.08 | 0.08 | 0.08 | 0.08 | 0.08 | 0.08 |
| Medium magnetic characteristic | Coercive force Hc (kA/m) | 196 | 195 | 197 | 196 | 198 | 198 | 185 | 190 | 177 | 197 |
|  | Residual magnetic flux density (mT) | 352 | 352 | 350 | 348 | 350 | 350 | 280 | 330 | 300 | 348 |
|  | SFD correction value | 0.266 | 0.268 | 0.264 | 0.263 | 0.257 | 0.260 | 0.267 | 0.269 | 0.269 | 0.266 |
|  | Squareness ratio | 0.90 | 0.90 | 0.90 | 0.91 | 0.91 | 0.90 | 0.90 | 0.89 | 0.89 | 0.89 |
|  | Degree of orientation | 3.4 | 3.5 | 3.6 | 3.5 | 3.6 | 3.6 | 3.2 | 3.1 | 3.1 | 3.4 |
|  | Residual magnetization (mT · $\mu$m) | 59.8 | 45.8 | 28.0 | 17.4 | 28.0 | 28.0 | 22.4 | 26.4 | 24.0 | 27.8 |
| Surface roughness | Ra (nm) | 1.6 | 1.6 | 1.6 | 1.8 | 1.6 | 1.6 | 1.8 | 1.8 | 1.9 | 1.8 |
|  | Rz (nm) | 14 | 16 | 15 | 17 | 15 | 15 | 18 | 19 | 19 | 18 |
|  | Rmax (nm) | 19 | 24 | 22 | 25 | 22 | 23 | 23 | 25 | 25 | 23 |

TABLE 4-continued

|  | Example 1 | Example 2 | Example 3 | Example 4 | Comparative example 1 | Example 5 | Example 6 | Example 7 | Example 8 | Example 9 |
|---|---|---|---|---|---|---|---|---|---|---|
| Carrier output (27.0 MHz) (dB) | +5.8 | +2.8 | +0.0 | −2.4 | +0.0 | +0.0 | −2.6 | −0.6 | −2.8 | −0.4 |
| Noise output (28.0 MHz) (dB) | +0.0 | −2.0 | −3.8 | −5.0 | +0.0 | −2.2 | −5.6 | −4.2 | −5.0 | −3.4 |
| C/N characteristic (dB) | +5.8 | +4.8 | +3.8 | +2.6 | +0.0 | +2.2 | +3.0 | +3.6 | +2.2 | +3.0 |

TABLE 5

|  |  | Example 10 | Comparative example 2 | Comparative example 3 | Example 11 | Example 12 | Comparative example 4 | Example 13 | Example 14 | Example 15 |
|---|---|---|---|---|---|---|---|---|---|---|
| Ferromagnetic alloy powder | | a-7 | b-2 | b-3 | a-8 | a-9 | b-4 | a-10 | a-11 | a-12 |
| Magnetic layer thickness (μm) | | 0.08 | 0.08 | 0.08 | 0.08 | 0.08 | 0.08 | 0.08 | 0.08 | 0.08 |
| Medium magnetic characteristic | Coercive force Hc (kA/m) | 190 | 182 | 160 | 187 | 194 | 186 | 189 | 196 | 192 |
| | Residual magnetic flux density (mT) | 340 | 320 | 280 | 340 | 343 | 320 | 330 | 349 | 340 |
| | SFD correction value | 0.269 | 0.279 | 0.269 | 0.264 | 0.269 | 0.278 | 0.269 | 0.266 | 0.270 |
| | Squareness ratio | 0.89 | 0.86 | 0.90 | 0.90 | 0.90 | 0.88 | 0.88 | 0.89 | 0.88 |
| | Degree of orientation | 3.2 | 2.8 | 3.2 | 3.4 | 3.4 | 3.0 | 3.0 | 3.1 | 3.0 |
| | Residual magnetization (mT · μm) | 27.2 | 25.6 | 22.4 | 27.2 | 27.4 | 25.6 | 26.4 | 27.9 | 27.2 |
| Surface roughness | Ra (nm) | 1.9 | 2.4 | 1.7 | 1.6 | 1.6 | 1.8 | 2.1 | 1.9 | 2.1 |
| | Rz (nm) | 19 | 24 | 17 | 15 | 16 | 18 | 22 | 19 | 21 |
| | Rmax (nm) | 25 | 29 | 22 | 22 | 22 | 24 | 26 | 25 | 26 |
| Carrier output (27.0 MHz) (dB) | | −0.6 | −1.8 | −2.6 | −0.6 | −0.4 | −0.8 | −0.8 | −0.4 | −0.6 |
| Noise output (28.0 MHz) (dB) | | −3.2 | −2.4 | −4.0 | −4.0 | −3.8 | −1.6 | −3.0 | −3.4 | −2.8 |
| C/N characteristic (dB) | | +2.6 | +0.6 | +1.4 | +3.4 | +3.4 | +0.8 | +2.2 | +3.0 | +2.2 |

According to the above description, as is clear from the evaluation results shown in the above-mentioned Tables 4 and 5, the magnetic recording medium of every Example has balanced characteristics compared with that in the magnetic recording media of Comparative examples, and therefore, is a magnetic recording medium having an excellent C/N characteristic.

What is claimed is:

1. A magnetic recording medium, wherein the average major-axis length (L) of a ferromagnetic alloy powder primarily contained together with a binder in a magnetic layer provided on at least one surface of a non-magnetic support is less than 0.10 μm, and wherein the ferromagnetic alloy powder contains Co at a content of 15 to 28 at % relative to Fe, and contains Y at a content of 22 μmol/m$^2$ or more with respect to a specific surface area (Sc) calculated from the average major-axis length (L) and the crystallite diameter (d).

2. The magnetic recording medium according to claim 1, wherein the ferromagnetic alloy powder contains Al at a content within the range of 27 to 45 μmol/m$^2$ with respect to the specific surface area (Sc).

3. The magnetic recording medium according to claim 2, wherein the average thickness of the magnetic layer is 0.03 to 0.30 μm, and wherein a non-magnetic layer is provided between the non-magnetic support and the magnetic layer.

4. The magnetic recording medium according to claim 1, wherein the average thickness of the magnetic layer is 0.03 to 0.30 μm, and wherein a non-magnetic layer is provided between the non-magnetic support and the magnetic layer.

5. The magnetic recording medium according to claim 1, wherein the average major-access length (L) of the ferromagnetic alloy powder is from 0.03 to 0.8 μm.

6. The magnetic recording medium according to claim 1, wherein Y is present in an amount of 24 μmol/m$^2$ or more.

7. The magnetic recording medium according to claim 1, wherein Y is present in an amount of 27 μmol/m$^2$ or more.

8. The magnetic recording medium according to claim 1, wherein the ferromagnetic alloy powder contains Al at a content within the range of 27 to 40 μmol/m$^2$ relative to the specific surface area (Sc).

9. The magnetic recording medium according to claim 1, wherein Co/Fe in the ferromagnetic alloy powder is from 16 to 24.

10. The magnetic recording medium according to claim 1, wherein Y/(Fe+Co) is from 7.9 to 9.8.

11. A magnetic recording medium, wherein the average major-axis length (L) of a ferromagnetic alloy powder primarily contained together with a binder in a magnetic layer provided on at least one surface of a non-magnetic support is less than 0.10 μm, and wherein the ferromagnetic alloy powder contains Co at a content of 15 to 28 at % relative to Fe, and contains Y at a content of 20 μmol/m$^2$ or more with respect to a BET specific surface area (Sbet) of the ferromagnetic alloy powder.

12. The magnetic recording medium according to claim 11, wherein the ferromagnetic alloy powder contains Al at a content within the range of 22 to 38 μmol/m$^2$ with respect to the BET specific surface area (Sbet) of the ferromagnetic alloy powder.

13. The magnetic recording medium according to claim 12, wherein the average thickness of the magnetic layer is 0.03 to 0.30 μm, and wherein a non-magnetic layer is provided between the non-magnetic support and the magnetic layer.

14. The magnetic recording medium according to claim 11, wherein the average thickness of the magnetic layer is 0.03 to 0.30 μm, and wherein a non-magnetic layer is provided between the non-magnetic support and the magnetic layer.

15. The magnetic recording medium according to claim 11, wherein the average major-access length (L) of the ferromagnetic alloy powder is from 0.03 to 0.8 μm.

16. The magnetic recording medium according to claim 11, wherein Y is present in an amount of 22 μmol/m$^2$ or more.

17. The magnetic recording medium according to claim 11, wherein Y is present in an amount of 24 μmol/m$^2$ or more.

18. The magnetic recording medium according to claim 11, wherein the ferromagnetic alloy powder contains Al at a content within the range of 22 to 34 μmol/m$^2$ with respect to a BET specific surface area (Sbet).

19. The magnetic recording medium according to claim 11, wherein Co/Fe in the ferromagnetic alloy powder is from 16 to 24.

20. The magnetic recording medium according to claim 11, wherein Y/(Fe+Co) is from 7.9 to 9.8.

* * * * *